US008393682B2

(12) United States Patent
Hosoda et al.

(10) Patent No.: US 8,393,682 B2
(45) Date of Patent: Mar. 12, 2013

(54) SEAT BACK LOCKING DEVICE FOR AUTOMOBILE

(75) Inventors: Hirotsugu Hosoda, Shizuoka-ken (JP); Takashi Ono, Kanagawa-ken (JP); Takefumi Mitsugi, Kanagawa-ken (JP)

(73) Assignees: Suzuki Motor Corporation (JP); NHK Spring Co., Ltd. (JP)

( * ) Notice: Subject to any disclaimer, the term of this patent is extended or adjusted under 35 U.S.C. 154(b) by 361 days.

(21) Appl. No.: 12/843,185

(22) Filed: Jul. 26, 2010

(65) Prior Publication Data

US 2011/0056256 A1 Mar. 10, 2011

(30) Foreign Application Priority Data

Sep. 4, 2009 (JP) ................................. 2009-205085

(51) Int. Cl.
*B60N 2/02* (2006.01)

(52) U.S. Cl. ................. 297/378.13; 292/216; 296/65.16

(58) Field of Classification Search ............. 297/378.13; 292/216; 296/65.16, 65.17, 65.18
See application file for complete search history.

(56) References Cited

U.S. PATENT DOCUMENTS

| 4,637,648 | A | * | 1/1987 | Okino et al. | ..................... 296/63 |
| 5,762,401 | A | * | 6/1998 | Bernard | .................... 297/378.13 |
| 6,139,076 | A | * | 10/2000 | Hara et al. | ................. 292/336.3 |
| 6,755,449 | B2 | * | 6/2004 | Weinerman et al. | .......... 292/198 |
| 7,416,254 | B2 | * | 8/2008 | Jennings | .................. 297/378.12 |
| 7,635,166 | B2 | * | 12/2009 | Ishikawa | .................... 297/463.1 |
| 7,909,405 | B2 | * | 3/2011 | Arima | ..................... 297/378.12 |

FOREIGN PATENT DOCUMENTS

JP          4-6982 U       2/1992

* cited by examiner

*Primary Examiner* — Laurie Cranmer
(74) *Attorney, Agent, or Firm* — Myers Bigel Sibley & Sajovec, PA

(57) ABSTRACT

A seat back locking device for an automobile for a seat back 5 configured so as to be capable of being changed from an upright position to a folded-down position and vice versa, including a locking mechanism 10 for locking the seat back 5 in the upright position, a locking knob 20 for unlocking the locking mechanism 10, and a key cylinder 30 capable of locking and unlocking the locking knob 20. In the locking device, a contact part 33 that comes into contact with a contacted part 26 provided on the locking knob 20 is connectingly provided integrally with a cylinder body 31 of the key cylinder 30 so that the key cylinder 30 can be changed over between a locked state in which the contact part 33 comes into contact with the contacted part 26 to inhibit the rotation of the locking knob 20 and an unlocked state in which the contact part 33 does not come into contact with the contacted part 26 to allow the rotation of the locking knob 20.

6 Claims, 4 Drawing Sheets

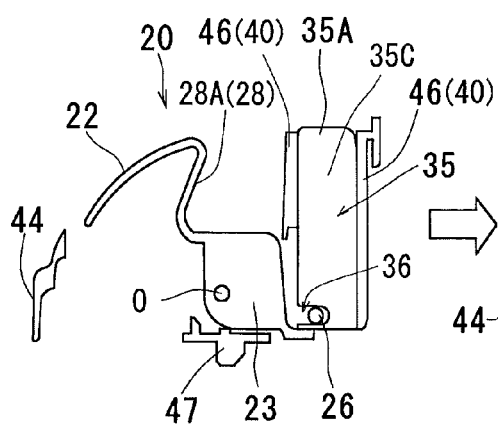
FIG.4(a)
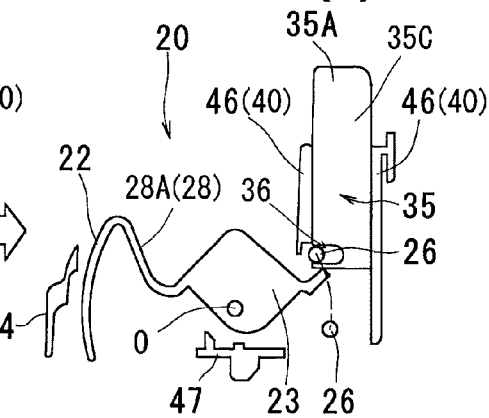
FIG.4(b)
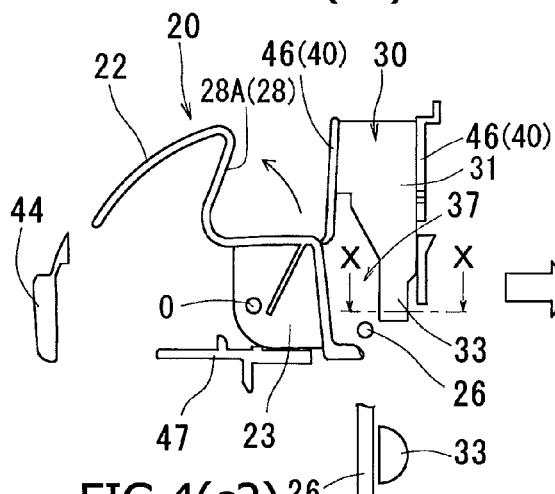
FIG.4(c1)
FIG.4(c2)
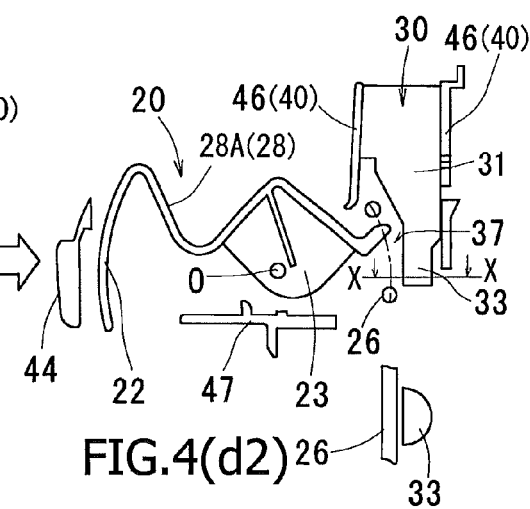
FIG.4(d1)
FIG.4(d2)
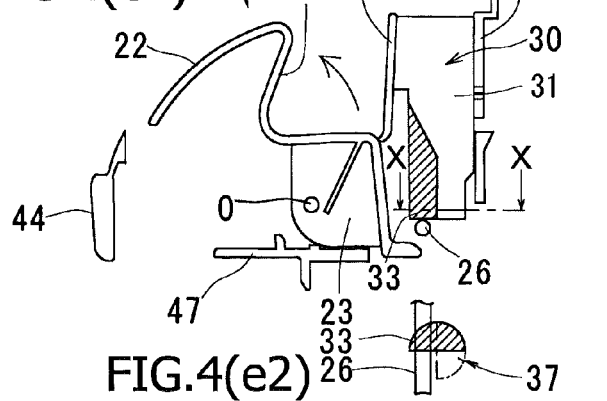
FIG.4(e1)
FIG.4(e2)

SEAT BACK LOCKING DEVICE FOR AUTOMOBILE

CROSS-RELATED APPLICATIONS

This application claims priority from Japanese Patent Application No. 2009-205085; filed Sep. 4, 2009, the disclosure of which is incorporated herein by reference in its entirety.

BACKGROUND OF THE INVENTION

1. Field of the Invention

The present invention relates to a seat back locking device for an automobile, the seat back separating a vehicle compartment from a luggage compartment that is configured so as to be capable of being changed from an upright position to a folded-down position, in which the seat back is folded down to the vehicle front side, and vice versa, including a locking mechanism for locking the seat back in the upright position, a rotary locking knob for unlocking the locking mechanism, and a key cylinder capable of locking and unlocking the locking knob.

2. Description of Related Art

For an automobile in which a seat back separating a vehicle compartment from a luggage compartment is configured so as to be capable of being changed from an upright position to a folded-down position, in which the seat back is folded down to the vehicle front side, and vice versa, even if the luggage compartment has been locked up, luggage in the luggage compartment may be stolen by folding the seat back down to the vehicle front side from the vehicle compartment side. Therefore, by providing a key cylinder capable of locking and unlocking a locking knob, the luggage in the luggage compartment may be prevented from being stolen.

Conventionally, in a seat back locking device for an automobile, as disclosed in Japanese Examined Utility Model Application Publication No. 04-6982, a contact part that comes into contact with a contacted part provided on a support case for a locking knob has been formed of a plate material separate from a cylinder body part of a key cylinder and has been connected to the lower end portion of the cylinder body part.

By this configuration, the key cylinder has been formed so as to be capable of being changed from a locked state in which the contact part comes into contact with the contacted part to inhibit the rotation of the locking knob to an unlocked state in which the contact part does not come into contact with the contacted part to allow the rotation of the locking knob and vice versa.

Unfortunately, according to the above-described conventional configuration, the contact part that comes into contact with the contacted part has been formed of the plate material separate from the cylinder body part of the key cylinder. Therefore, the number of parts of the key cylinder has been large, the construction has been complicated, and the required space has been large. Also, the rigidity of the contact part has been less likely to be ensured.

SUMMARY OF THE INVENTION

An object of the present invention is to provide a seat back locking device for an automobile in which the number of parts of a key cylinder can be reduced, the construction can be simplified, the required space can be made small, and the rigidity of the key cylinder can be ensured.

The present invention is characterized by a seat back locking device for an automobile, the seat back separating a vehicle compartment from a luggage compartment being configured so as to be capable of being changed from an upright position to a folded-down position, in which the seat back is folded down to the vehicle front side, and vice versa, including:

a locking mechanism for locking the seat back in the upright position;

a rotary locking knob for unlocking the locking mechanism; and a key cylinder capable of locking and unlocking the locking knob, wherein a contact part that comes into contact with a contacted part provided on the locking knob is connectingly provided integrally with a cylinder body of the key cylinder so that a changeover can be accomplished between a locked state in which the contact part comes into contact with the contacted part to inhibit the rotation of the locking knob and an unlocked state in which the contact part does not come into contact with the contacted part to allow the rotation of the locking knob.

According to this configuration, since the contact part that comes into contact with the contacted part provided on the locking knob is connectingly provided integrally with the cylinder body of the key cylinder, as compared with the structure in which the contact part is formed by a member separate from the cylinder body of the key cylinder, the number of parts can be reduced, the construction can be simplified, and the required space can be made small. Moreover, the rigidity of the contact part can be ensured.

In the present invention, if the locking device is configured so that the cylinder body is rotated around the axis of the cylinder body to accomplish the changeover between the locked state and the unlocked state;

one end part on the opposite side to the opening of a key insertion hole of the cylinder body is caused to face to the contacted part of the locking knob;

the contact part is provided in the one end part of the cylinder body; and a notch, which avoids interference of the contacted part with the one end part of the cylinder body caused by the rotation of the locking knob in the unlocked state, is formed in the one end part of the cylinder body, the effects described below can be achieved.

Since the notch, which avoids interference of the contacted part with the one end part of the cylinder body caused by the rotation of the locking knob in the unlocked state, is formed in the one end part of the cylinder body, the structure for avoiding interference of the contacted part with the one end part of the cylinder body caused by the rotational operation of the locking knob can be manufactured easily, and the construction can be simplified.

In the present invention, if the one end part of the cylinder body is formed so as to have a semicircular cross section, the construction of the one end part of the cylinder body can be simplified.

In the present invention, if the locking knob is supported on a support case so as to be rotatable around the transverse axis;

the locking knob and the support case are disposed above the locking mechanism;

the key cylinder is vertically supported on the support case with the one end part of the cylinder body being positioned on the downside;

a pin extending along the transverse axis is provided on the locking knob to form the contacted part;

the pin in the locked state is arranged under the contact part;

the locking device is configured so that when the locking knob is rotated in such a manner that the pin rotates upward in the unlocked state, the locking mechanism is unlocked;

an indicator for indicating that the locking mechanism has been unlocked is accommodatedly supported on the support case so as to be movable up and down;

a locking part formed in a lower end portion of the indicator is locked to the pin to move the indicator up and down with the rotation of the locking knob; and when the locking mechanism is unlocked by the upward rotation of the pin with the rotation of the locking knob in the unlocked state, an upper part of the indicator projects from the interior of the support case to above the support case to indicate that the locking mechanism has been unlocked, the effects described below can be achieved.

Since the pin extending along the transverse axis is provided on the locking knob to form the contacted part, and the locking part formed in the lower end portion of the indicator is locked to the pin to move the indicator up and down with the rotation of the locking knob, the pin common to the indicator and the key cylinder is used as a means for accomplishing functions of the indicator and the key cylinder. Thereby, the number of parts can further be reduced.

Also, since when the locking mechanism is unlocked by the upward rotation of the pin with the rotation of the locking knob in the unlocked state, the upper part of the indicator projects from the interior of the support case to above the support case to indicate that the locking mechanism has been unlocked, the passenger can be given a notification that the locking mechanism has been unlocked.

That is, when an attempt is made to pull the seat back, which has been folded down to the vehicle front side, up again and to lock the seat back in the upright position, if the locking is incomplete, the rotation of the locking knob also does not return completely. Therefore, the indicator, which is interlockingly connected to the locking knob via the pin, also is not pulled completely in the support case, so that the upper part of the indicator is not hidden completely. As a result, the passenger sees the upper part of the indicator, and therefore can know that the seat back is in an insufficiently locked state (unlocked state).

In the present invention, if the upper part of the indicator is colored in a color for discrimination that is different from the color of the support case, the passenger can more reliably be given a notification that the locking mechanism has been unlocked.

According to the present invention, there can be provided a seat back locking device for an automobile in which the number of parts of a key cylinder can be reduced, the construction can be simplified, the required space can be made small, and the rigidity of the key cylinder can be ensured.

BRIEF DESCRIPTION OF THE DRAWINGS

FIG. 4(a) is an operation view showing an indicator and the like before a key cylinder is unlocked and a locking knob is rotationally operated;

FIG. 4(b) is an operation view showing an indicator and the like in the state in which a key cylinder has been unlocked and a locking knob has been rotationally operated;

FIG. 4(c1) is an operation view showing a key cylinder and the like before the key cylinder is unlocked and a locking knob is rotationally operated, and FIG. 4(c2) is a sectional view taken along the line X-X of FIG. 4(c1);

FIG. 4(d1) is an operation view showing a key cylinder and the like in the state in which the key cylinder has been unlocked and a locking knob has been rotationally operated, and FIG. 4(d2) is a sectional view taken along the line X-X of FIG. 4(d1); and FIG. 4(e1) is an operation view showing a key cylinder and the like in the state in which the key cylinder has been locked, and FIG. 4(e2) is a sectional view taken along the line X-X of FIG. 4(e1).

DETAILED DESCRIPTION OF PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Figure 1:
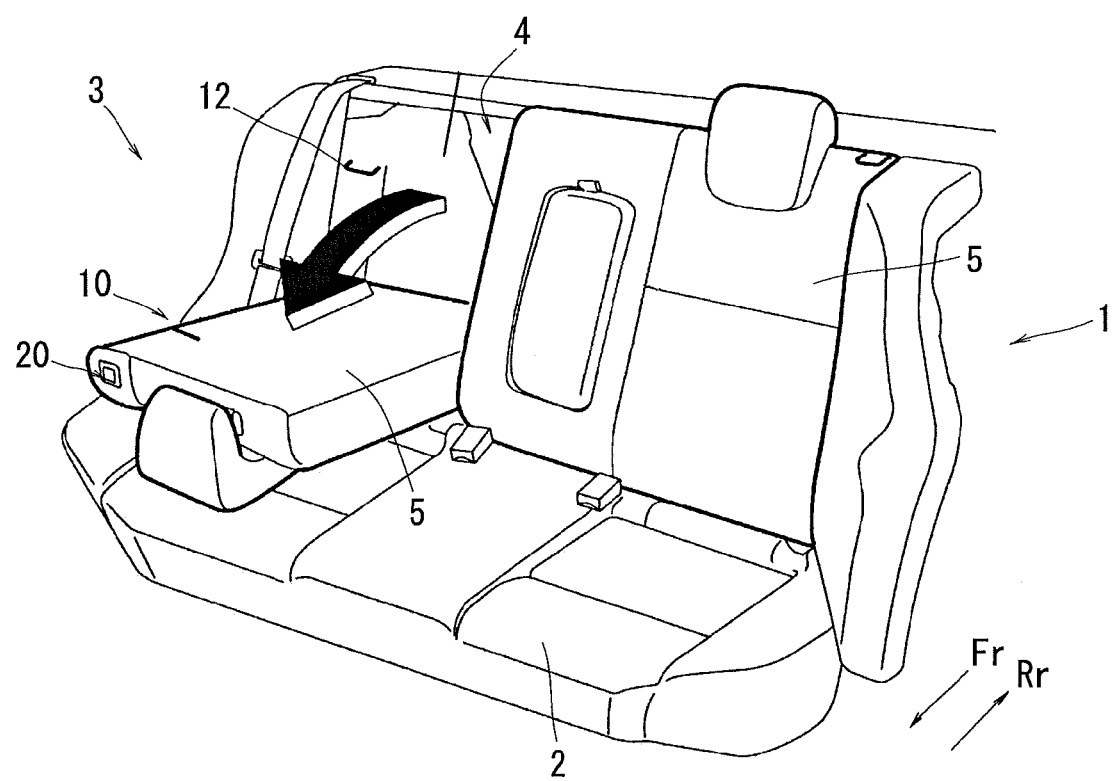
FIG. 1 is a perspective view of an automobile rear seat.

FIG. 1 shows a rear seat 1 provided in a vehicle compartment 3 of a sedan-type automobile. The rear seat 1 includes a seat cushion 2 and a plurality of seat backs 5.

The seat back 5 is configured so as to be capable of being changed from an upright position to a folded-down position, in which the seat back is folded down to the vehicle front Fr side, and vice versa, and the upright position thereof separates a vehicle compartment 3 from a luggage compartment 4. When the seat back 5 is set in a folded-down position, the opening of the luggage compartment 4, having been closed by the seat back 5, appears so that luggage in the luggage compartment 4 can be taken out from or stowed in the vehicle compartment 3.

Figure 2:
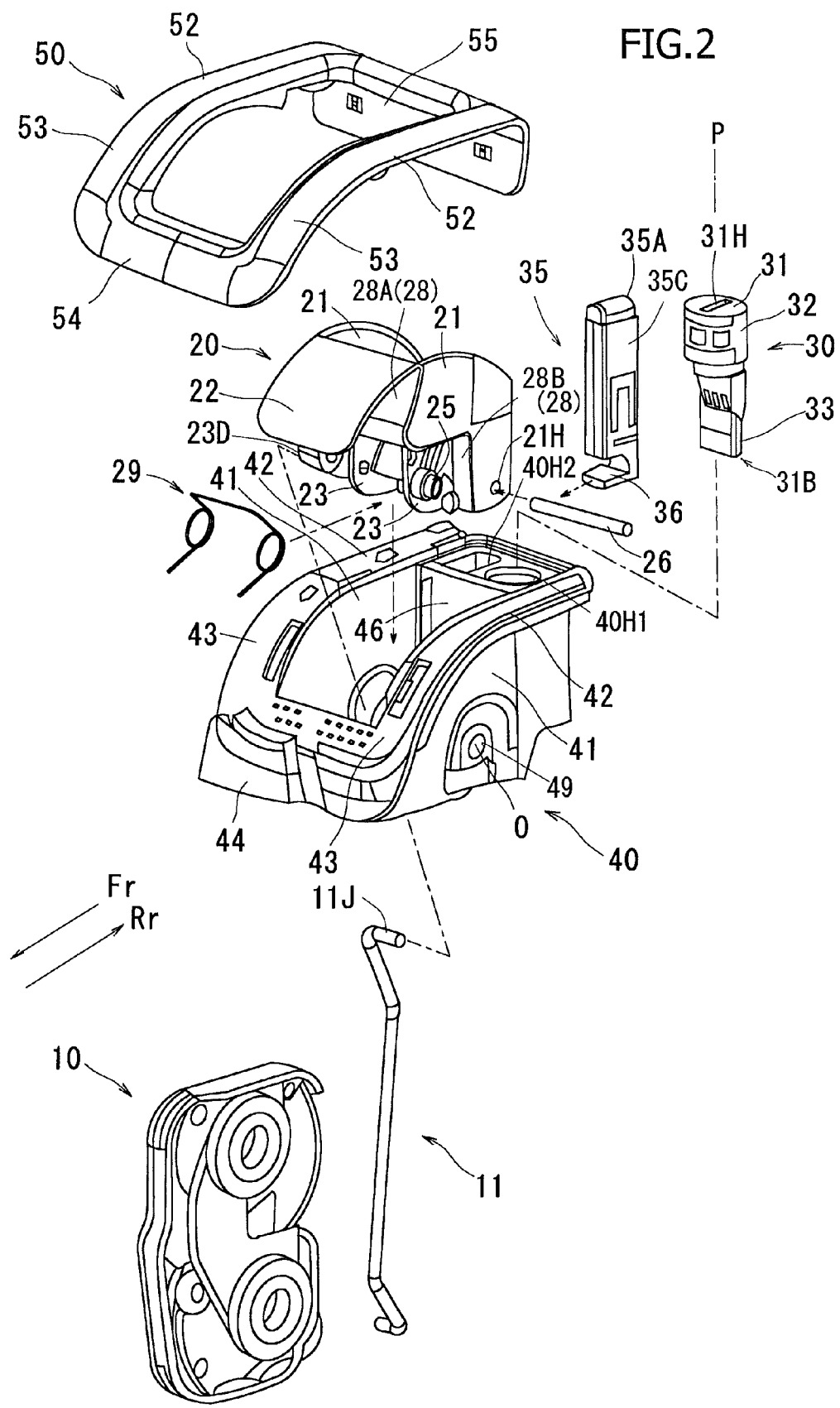
FIG. 2 is an exploded perspective view of a seat back locking device for an automobile.
Figure 3:
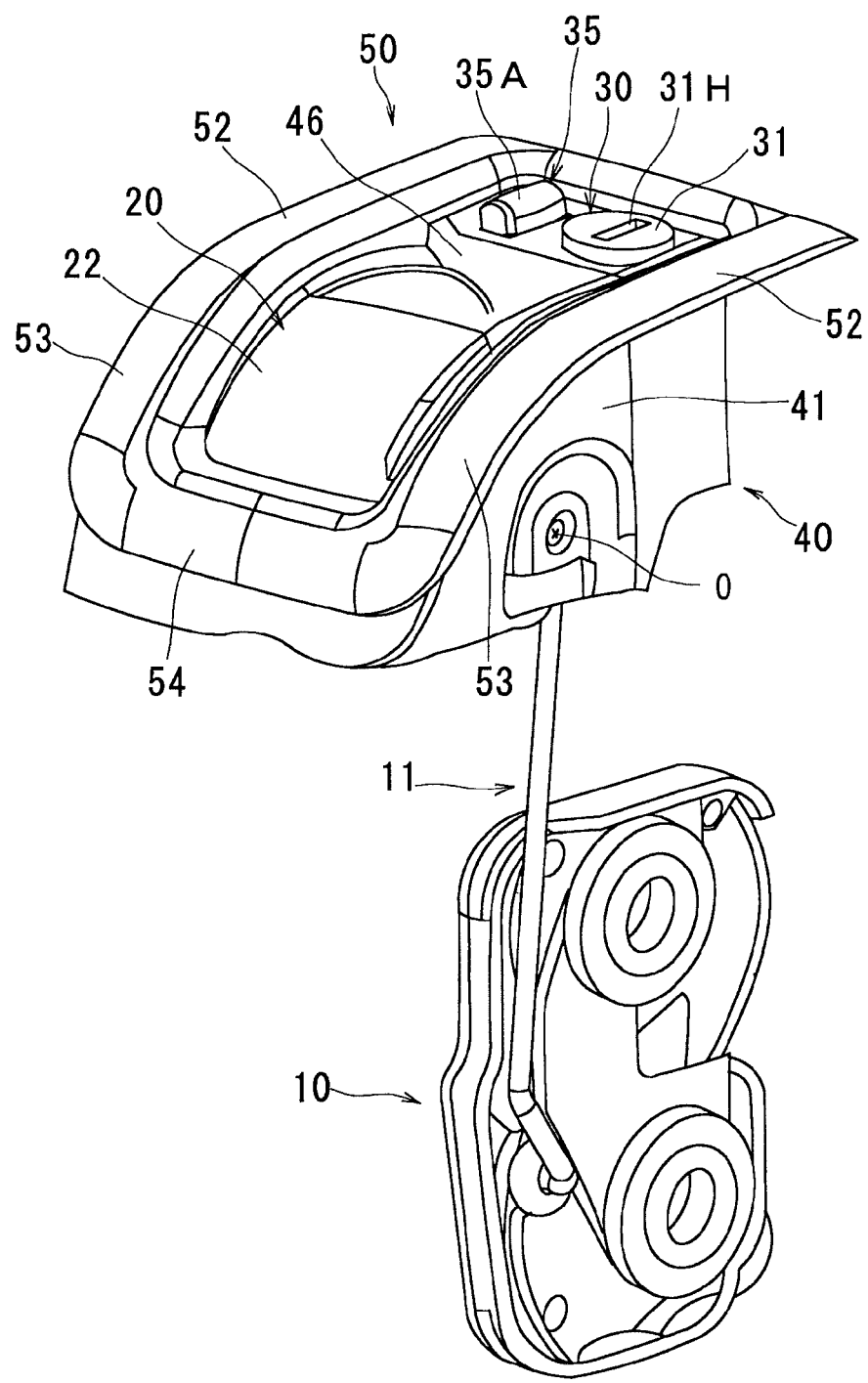
FIG. 3 is a perspective view of a seat back locking device for an automobile.

As shown in FIGS. 1 to 3, there are provided a locking mechanism 10 for locking the seat back 5 in the upright position, a rotary locking knob 20 for unlocking the locking mechanism 10, and a key cylinder capable of locking and unlocking the locking knob 20. When the locking knob 20 is locked by the key cylinder 30, the locking mechanism 10 cannot be unlocked by the locking knob 20, so that the seat back 5 cannot be set in the folded-down position. Thereby, the luggage in the luggage compartment 4 can be prevented from being stolen when a window of the automobile is broken for breaking into the vehicle compartment 3.

The locking mechanism 10 is incorporated in an upper portion on the back surface side at the side of the seat back 5. As shown in FIG. 1, a U-shaped striker 12 is fixed to the seat frame of the rear seat 1. An engagement part of the locking mechanism 10 engages with the striker 12 to lock the seat back 5 in the upright position.

The locking knob 20 is supported on a support case 40 so as to be rotatable around a transverse axis O extending along the width direction of the seat back 5, and the locking knob 20 and the support case 40 are arranged and incorporated in an upper face portion at the side of the seat back 5 located above the locking mechanism 10. The locking knob 20 is connected to the locking mechanism 10 via an operation rod 11 (connecting member) extending along the up and down direction. When the operation rod 11 is pulled up by the rotation of the locking knob 20 around the transverse axis O, the engagement part of the locking mechanism 10 is disengaged from the striker 12, so that the locking mechanism 10 is unlocked. Thereby, the seat back 5 is made in a state of being capable of being folded down to the vehicle front Fr side.

Construction of Locking Knob 20

As shown in FIG. 2, the locking knob 20 includes a pair of right and left first side walls 21 the front edge of which is formed in a step shape, a step-shaped connection wall 28 which connects the front edges of both the side walls 21 to each other and on which a finger is put when the locking knob 20 is rotationally operated, and a pair of right and left support walls 23 provided between a downward level difference surface of the connection wall 28 and a front surface 28B of the lower half portion of the connection wall 28.

The upper edge of the first side wall 21 is formed in an arcuate shape that is convex upward. An extension wall 22 having an arcuate shape continuous with the upper edge in side view extends from the upper end portion of the connection wall 28 to the front Fr (vehicle front Fr side), and a vertical wall part of the connection wall 28, which connects with the rear end portion of the extension wall 22, is formed as a finger putting part 28A.

Also, pin insertion holes 21H are formed concentrically in lower end portions on the rear side of the paired right and left first side walls 21, and both end portions of a pin 26 (corresponding to a contacted part) extending along the transverse axis O are insertedly fixed individually to the paired right and left pin insertion holes 21H. On the support wall 23, a cylindrical shaft part 25 is formed so as to project to the outside in the width direction of the locking knob 20.

Furthermore, a connection part 23D for the operation rod 11 is provided on one support wall 23 side, and a transversely directed upper end part 11J formed by bending the operation rod 11 is connected to the connection part 23D.

Construction of support case 40

The support case 40 includes a pair of right and left second side walls 41, a bottom wall 47 (refer to FIG. 4(a)) connecting the lower end portions of both the second side walls 41 to each other, and a pair of front and rear vertical walls 46 provided between the rear end portions of both the second side walls 41. Also, a first vertical hole 40H1 in which the key cylinder 30 is inserted from above and a second vertical hole 40H2 in which an indicator 35 is inserted from above are formed between both the vertical walls 46. The indicator 35 indicates that the locking mechanism 10 has been unlocked. The first vertical hole 40H1 and the second vertical hole 40H2 are arranged in the right and left direction, and the first vertical hole 40H1 is located on the vehicle inside in the vehicle inside direction (the inside in the vehicle width direction) as compared with the second vertical hole 40H2.

The front edge of the second side wall 41 tilts upward toward the rear, and a connecting part between the front edge and the upper edge is formed in an arcuate shape so as to connect with the horizontal upper edge of the second side wall 41. Also, a front flange 43 juts out of the front edge of the second side wall 41, and an upper flange 42 juts out of the upper edge thereof and connects with the front flange 43. Furthermore, a front wall 44 is provided between the lower end portions at the paired right and left front edges and is connected to the front flanges 43.

In the central portions of the paired right and left second side walls 41, support holes 49 are formed, and the paired right and left shaft parts 25 of the locking knob 20 are insertedly supported in the paired right and left support holes 49 individually so as to be rotational. Thereby, the transverse axis O of the locking knob 20 (the axis O of the shaft part 25) is made in a state of extending along the width direction of the seat back 5. Also, a spring 29 for rotationally urging the locking knob 20 to the rear Rr (vehicle rear Rr side) is mounted to the paired right and left shaft parts 25.

In order to unlock the locking mechanism 10, a finger is put on the finger placing part 28A of the locking knob 20 in the state in which the key cylinder 30 is unlocked, and the locking knob 20 is rotated to the vehicle front Fr side against the urging force of the spring 29. Thereby, the operation rod 11 is raised to disengage the engagement part of the locking mechanism 10 from the striker 12, so that the locking mechanism 10 is unlocked. That is, when the locking knob 20 rotates so that the pin 26 rotates upward in the unlocked state, the locking mechanism 10 is unlocked. When the finger is released from the finger placing part 28A, the locking knob 20 is rotated to the vehicle rear Rr side by the urging force of the spring 29 and restores to the original position.

Construction of Bezel 50

A ring-shaped bezel 50 is mounted to the support case 40 from above. The bezel 50 includes a pair of right and left first wall parts 52 individually lapping on the paired right and left upper flanges 42 of the support case 40, a second wall part 55 that extends downward from the rear end portions of the first wall parts 52 and covers the upper end portion of the support case 40 from the rear Rr, third wall parts 53 extending downward toward the front so as to lap on the front flanges 43 of the support case 40, and a fourth wall part 54 lapping on the front wall 44 of the support case 40, and the inside thereof in the radial direction is open to expose the locking knob 20 upward.

Construction of Key Cylinder 30

The key cylinder 30 includes a metallic ring 32 and a resin-made cylinder body 31 having a circular cross section, which is insertedly supported by the ring 32 so as to be rotatable. The key cylinder 30 is inserted in the first vertical hole 40111 in the support case 40 vertically with one end part 31B on the opposite side to the opening of a key insertion hole 31H of the cylinder body 31 being positioned on the downside, and the ring 32 is fixed to the support case 40, whereby the key cylinder 30 is supported by the support case 40.

Also, a contact part 33 that comes into contact with the pin 26 of the locking knob 20 is connectingly provided integrally with the one end part 31B of the cylinder body 31 of the key cylinder 30 so that a changeover can be accomplished, by the operation of the key cylinder 30, between a locked state in which the contact part 33 comes into contact with the pin 26 to inhibit the rotation of the locking knob 20 (refer to FIGS. 4(e1) and 4(e2), for the contact part 33, the solid line portion and the hatched portion indicate the locked state) and an unlocked state in which the contact part 33 does not come into contact with the pin 26 to allow the rotation of the locking knob 20 (refer to FIGS. 4(c1), 4(c2), 4(d1) and 4(d2)).

That is, the configuration is made such that the changeover between the locked state and the unlocked state is accomplished by the rotation of the cylinder body 31 around the axis P of the cylinder body 31. When the key is inserted in the key insertion hole 31H and the cylinder body 31 is rotated through a preset angle around the axis P of the cylinder body 31, the locked state in which the locking knob 20 is locked (refer to FIGS. 4(e1) and 4(e2)) is established, and when the key is rotated through the preset angle in the reverse direction, the unlocked state (refer to FIGS. 4(c1), 4 (c2), 4(d1) and 4(d2)) is established.

Describing in more detail, the one end part 31B on the opposite side to the opening of the key insertion hole 31H of the cylinder body 31 is caused to face to the pin 26 of the locking knob 20 from above, and the contact part 33 is provided in the one end part 31B of the cylinder body 31. Also, a notch 37, which avoids the interference of the pin 26 with the one end part 31B of the cylinder body 31 caused by the rotation of the locking knob 20 in the unlocked state, is formed in the one end part 31B of the cylinder body 31. As shown in FIGS. 4(c1) to 4(e2), the one end part 31B of the cylinder body 31 is formed so as to have a semicircular cross section. The notch 37 consists of a lower notch part on the transverse outside of the one end part 31B formed so as to have a semicircular cross section of the cylinder body 31 and an upward-tapered upper notch part located continuously above the lower notch part. The pin 26 in the locked state is disposed under the contact part 33.

Construction of Indicator 35

As shown in FIG. 2, the indicator 35 indicating that the locking mechanism 10 has been unlocked is formed in a stick shape that has a rectangular cross section and is long in the vertical direction. An upper end part 35A of the indicator 35 is formed in an arcuate shape in cross section as viewed from the vehicle front Fr side, and a notch groove 36 (corresponding to a locking part) that is open to the vehicle front Fr side is formed in a lower end portion of the indicator 35.

The configuration is made such that the indicator 35 is inserted in the second vertical hole 40H2 and is accommodatedly supported on the support case 40 so as to be movable up and down, and the notch groove 36 in the lower end portion of the indicator 35 is locked to the pin 26, so that the indicator 35 is moved up and down with the rotation of the locking knob 20 (refer to FIGS. 4(a) and 4(b)).

Also, the configuration is made such that when the locking mechanism 10 is unlocked by the upward rotation of the pin 26 with the rotation of the locking knob 20 in the unlocked state, an upper part 35C of the indicator 35 projects from the interior of the support case 40 to above the support case 40 to indicate that the locking mechanism 10 has been unlocked. The upper part 35C of the indicator 35 is colored in a warning color (a red color to draw attention) that is distinguishing by being different from the color of the support case 40.

Operation of Seat Back Locking Device (1) FIGS. 4(a), 4(c1) and 4(c2) show the state in which the key cylinder 30 is unlocked. When a finger is placed on the finger placing part 28A of the locking knob 20 in this state, and the locking knob 20 is rotationally operated to the vehicle front Fr side against the urging force of the spring 29, as shown in FIGS. 4(d1) and 4(d2), the pin 26 passes through the notch 37 in the one end part 31B of the cylinder body 31 and rises without interference with the contact part 33 of the one end part 31B of the cylinder body 31 of the key cylinder 30.

Thereby, the operation rod 11 (refer to FIGS. 2 and 3) is pulled up by the locking knob 20, and the engagement of the engagement part of the locking mechanism 10 with the striker 12 is released, so that the seat back 5 becomes in a state of being capable of being folded down to the vehicle front Fr side.

(2) As the pin 26 passes through the notch 37 in the lower end portion of the cylinder body 31 and rises as in the item (1),
as shown in FIG. 4(b), the pin 26 pushes the indicator 35 up and projects the colored upper part 35C of the indicator 35 from the upper surface of the support case 40. From this operation, the passenger can know that the seat back 5 has not been locked in the upright position.

(3) When an attempt is made to pull the seat back 5, which has been folded down to the vehicle front Fr side, up again and to lock the engagement part of the locking mechanism 10 to the striker 12, if the locking is incomplete, the operation rod 11 does not lower fully, so that the rotation of the locking knob 20 also does not return completely.

Therefore, the indicator 35, which is interlockingly connected to the locking knob 20 via the pin 26, also is not pulled completely in the second vertical hole 40H2 of the support case 40, so that the alarm color on the side surface of the colored upper part 35C of the indicator 35 is not hidden completely. As a result, the passenger sees the alarm color, and therefore can know that the seat back 5 is in an insufficiently locked state (unlocked state).

(4) FIGS. 4(e1) and 4(e2) show the locked state of the key cylinder 30. Even if an attempt is made to place a finger on the finger placing part 28A of the locking knob 20 in this state and to rotationally operate the locking knob 20 to the vehicle front Fr side, it is impossible for the pin 26 to come into contact with the contact part 33 of the one end part 31B of the cylinder body 31 of the key cylinder 30 and to rise.

Therefore, the operation rod 11 (refer to FIGS. 2 and 3) is not pulled up, and the engagement of the engagement part of the locking mechanism 10 with the striker 12 is not released, so that the seat back 5 cannot be folded down to the vehicle front Fr side. Thereby, the luggage in the luggage compartment 4 can be prevented from being stolen, for example, when a window of automobile is smashed for intrusion into the vehicle compartment 3.

The locking knob 20, the support case 40, and the indicator 35 are molded from a resin.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

What is claimed is:

1. A seat back locking device for an automobile, the seat back separating a vehicle compartment from a luggage compartment being configured so as to be capable of being changed from an upright position to a folded-down position, in which the seat back is folded down to the vehicle front side, and vice versa, comprising:
 a locking mechanism for locking the seat back in the upright position;
 a rotary locking knob for unlocking the locking mechanism;
 a key cylinder capable of locking and unlocking the locking knob, wherein
 a contact part which comes into contact with a contacted part provided on the locking knob is connectingly provided integrally with a cylinder body of the key cylinder so that a changeover can be accomplished between a locked state in which the contact part comes into contact with the contacted part to inhibit the rotation of the locking knob and an unlocked state in which the contact part does not come into contact with the contacted part to allow the rotation of the locking knob;

wherein the locking device is configured so that the cylinder body is rotated around an axis of the cylinder body to accomplish the changeover between the locked state and the unlocked state;

wherein one end part on an opposite side to an opening of a key insertion hole of the cylinder body is caused to face to the contacted part of the locking knob;

wherein the contact part is provided in the one end part of the cylinder body; and wherein a notch, which avoids interference of the contacted part with the one end part of the cylinder body caused by the rotation of the locking knob in the unlocked state, is formed in the one end part of the cylinder body.

2. The seat back locking device for an automobile according to claim 1, wherein the one end part of the cylinder body is formed so as to have a semicircular cross section.

3. The seat back locking device for an automobile according to claim 2, wherein the locking knob is supported on a support case so as to be rotatable around the a transverse axis;

the locking knob and the support case are disposed above the locking mechanism;

the key cylinder is vertically supported on the support case with the one end part of the cylinder body being positioned on a downside;

a pin extending along the transverse axis is provided on the locking knob to form the contacted part;

the pin in the locked state is arranged under the contact part;

the locking device is configured so that when the locking knob is rotated in such a manner that the pin rotates upward in the unlocked state, the locking mechanism is unlocked;

an indicator for indicating that the locking mechanism has been unlocked is accommodatedly supported on the support case so as to be movable up and down;

a locking part formed in a lower end portion of the indicator is locked to the pin to move the indicator up and down with the rotation of the locking knob; and when the locking mechanism is unlocked by the upward rotation of the pin with the rotation of the locking knob in the unlocked state, an upper part of the indicator projects from an interior of the support case to above the support case to indicated that the locking mechanism has been unlocked.

4. The seat back locking device for an automobile according to claim 3, wherein an upper part of the indicator is colored in a color for discrimination that is different from the color of the support case.

5. The seat back locking device for an automobile according to claim 1, wherein the locking knob is supported on a support case so as to be rotatable around a transverse axis;

the locking knob and the support case are disposed above the locking mechanism;

the key cylinder is vertically supported on the support case with the one end part of the cylinder body being positioned on a downside;

a pin extending along the transverse axis is provided on the locking knob to form the contacted part;

the pin in the locked state is arranged under the contact part;

the locking device is configured so that when the locking knob is rotated in such a manner that the pin rotates upward in the unlocked state, the locking mechanism is unlocked;

an indicator for indicating that the locking mechanism has been unlocked is accommodatedly supported on the support case so as to be movable up and down;

a locking part formed in a lower end portion of the indicator is locked to the pin to move the indicator up and down with the rotation of the locking knob; and when the locking mechanism is unlocked by the upward rotation of the pin with the rotation of the locking knob in the unlocked state, an upper part of the indicator projects from an interior of the support case to above the support case to indicated that the locking mechanism has been unlocked.

6. The seat back locking device for an automobile according to claim 5, wherein an upper part of the indicator is colored in a color for discrimination that is different from the color of the support case.

* * * * *

UNITED STATES PATENT AND TRADEMARK OFFICE
CERTIFICATE OF CORRECTION

PATENT NO.         : 8,393,682 B2                                      Page 1 of 1
APPLICATION NO.    : 12/843185
DATED              : March 12, 2013
INVENTOR(S)        : Hosoda et al.

It is certified that error appears in the above-identified patent and that said Letters Patent is hereby corrected as shown below:

In the Claims:
Column 9, Claim 3, Line 22: Please correct "around the a transverse axis;"
to read -- around a transverse axis; --

Signed and Sealed this
Thirteenth Day of May, 2014

Michelle K. Lee
*Deputy Director of the United States Patent and Trademark Office*